3,455,867
OXYMETHYLENE POLYMERS
Frank M. Berardinelli, South Orange, and David L. Bates, Scotch Plains, N.J., assignors to Celanese Corporation, a corporation of Delaware
No Drawing. Filed Apr. 1, 1965, Ser. No. 444,785
Int. Cl. C08g 1/22
U.S. Cl. 260—37                           16 Claims

ABSTRACT OF THE DISCLOSURE

Disclosed herein is a novel polymer composition prepared by incorporating an isocyanate and glass strands into an oxymethylene polymer. The isocyanate and glass fibres constitute a synergistic blend with regard to tensile strength, percentage elongation, flexural strength and the like.

---

The present invention relates to modified oxymethylene polymers. More particularly, the instant discovery concerns polyoxymethylenes containing fillers, these polyoxymethylenes exhibiting substantially enhanced physical properties.

According to the present invention a novel polymer composition is prepared by incorporating an isocyanate and glass strands into an oxymethylene polymer, preferably in the presence of a catalyst. Typically, a minor proportion of hexamethylene diisocyanate and a minor proportion of chopped glass strands are intimately blended, in the presence of a small but effective amount of catalyst (e.g. stannous octoate), with an oxymethylene polymer containing a small number of oxyethylene units interspersed therethrough. The resulting product manifests improved tensile strength, flex strength, impact strength, etc. Both the products and processes of the present invention will be better understood from the disclosure which follows.

Oxymethylene polymers having recurring —$CH_2O$— units have been known for many years. They may be prepared by polymerizing a source of oxymethylene units, such as anhydrous formaldehyde or trioxane, a cyclic trimer of formaldehyde. High molecular weight solid polyoxymethylenes have been prepared by polymerizing trioxane in the presence of cationic polymerization catalysts, including such compounds as boron trifluoride, antimony trifluoride, antimony fluorborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, thinoyl chloride, fluorosulfonic acid, phosphorus trichloride, titanium tetrachloride, ferric chloride, zirconium tetrachloride, aluminum trichloride, stannic chloride, stannous chloride and the alkane sulfonic acids, e.g., ethane sulfonic acid and methane sulfonic acid.

The preferred catalysts are boron fluoride and the boron fluoride complexes with water (such as boron fluoride monohydrate, boron-fluoride dihydrate, and boron fluoride trihydrate), and boron fluoride coordinate complexes with organic compounds, particularly those in which oxygen or sulfur is the donor atom. The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether, is the preferred coordinate complex. The boron fluoride complexes with phenol and with acetic acid are also very effective. Other specific boron fluoride complexes, for example, are the complexes with ethanol, methanol, propanol, butanol, methyl acetate, ethyl acetate, phenyl acetate, benzoic acid, acetic anhydride, acetone, methyl ethyl ketone, dimethyl ether, methyl phenyl ether, acetaldehyde, chloral, dimethyl sulfide, and ethyl mercaptan.

Suitable catalysts are disclosed in U.S. Patents 2,989,505, 2,989,506, 2,989,507, 2,989,508, 2,989,509, all of Donald E. Hudgin and Frank M. Berardinelli; 2,989,510, of Georgee J. Bruni; 2,989,511 of Arthur W. Schnizer, and in the article by Kern et al. in Angewandte Chemie 73, pp. 176-186 (Mar. 21, 1961).

Oxymethylene polymers of improved thermal stability may be prepared by introducing into the polymer chains, or attaching to the ends of the polymer chains, structures which are resistant to thermal detachment. The polymers may include interspersed oxyalkylene units with adjacent carbon atoms and preferably oxyethylene units as disclosed in U.S. Patent No. 3,027,352 of Walling, Brown and Bartz. Copolymers of this type may be described as having at least one chain containing oxymethylene (—$CH_2O$—) units (usually at least 85 mol percent) interspersed with (—OR—) units wherein R is a divalent radical containing at least two carbon atoms directly linked to each other and positioned in the chain between the two valences, with any substituent in the R radical being inert.

Specific interspersed monomeric units which may be incorporated are those derived from lactones, carbonates, cyclic acid anhydrides or ethylenically-unsaturated compounds, such as styrene, divinyl ether, vinyl acetate, vinyl methyl ketone or acrolein, as disclosed in the aforementioned article by Kern et al. The polymers may be endcapped as, for example, by acylation or etherification after polymerization or during polymerization by the use of selected chain transfer agents.

Oxymethylene copolymers and terpolymers with such oxacyclic or oxo-functional compounds, as cyclic ethers having at least two cyclic ether rings, dialdehydes and diketones, have also been prepared, as described in, e.g., French Patent No. 1,345,218.

As used in the specification and claims, the term "oxymethylene polymers" denotes homopolymers and copolymers (including terpolymers, etc.) having at least 60% recurring oxymethylene units, and further includes substituted oxymethylene polymers, wherein the substituents are inert, i.e., do not participate in undesirable side reactions.

During molding processes, oxymethylene polymers are generally heated to temperatures between about 180° and 220° C. for relatively short periods between about 3 and about 10 minutes. Unless the thermal degradation rate of the polymer has been reduced to a desirably low level it has been found that molded products have uneven surface characteristics, due to gassing and that the molding operation produces substantial amounts of formaldehyde gas, which constitutes an industrial hazard. In order to ameliorate this defect and reduce the degradation to a desirable level, chemical stabilizers are added to oxymethylene polymers.

The physical properties of these oxymethylene polymers also can be enhanced by addition to the polymers of glass strands, such as chopped glass fibers. In so doing, the tensile strength, flex strength and modulus are increased and the thermal coefficient of expansion of the polymer is reduced. Unfortunately, addition of these glass fibers has had an undesirable effect on thermal stability and impact strength, thus limiting the use, to a certain degree, to which the thus-filled oxymethylene polymers might be put.

Pursuant to the present invention, however, it has been found that incorporation of both an isocyanate and glass strands in oxymethylene polymers of the type contemplated herein, preferably in the presence of a small but effective amount of catalyst, has a potentiating or synergistic effect on the physical properties of these polymers. For reasons which are not fully understood not only are tensile strength and flex strength improved, but impact strength is enhanced. Insofar as tensile strength and flex strength are concerned, the cooperative effect of the isocyanate and glass strands in the polymer is such that the total effect of these is greater than the sum of the two effects taken independently. Table I, infra, illustrates this phenomenon, which is even more accentuated by the presence of the catalyst, as suggested above and as will be seen hereinafter.

While the amount of isocyanate incorporated into the polymer depends to a certain degree upon the specific isocyanate used, a proportion of between about 0.1 and about 5 weight percent (based upon the total weight of the glass and the polymer) produces the very desirable results herein reported.

The glass strands, on the other hand, may be present, and preferably are present, in substantially greater amounts. For example, good results may be achieved when blending equal weights of oxypolymer and glass strands. By the same token, enhanced properties are achieved using as little as 10 weight percent glass strands, based upon the total weight of the glass and polymer in the composition. This is particularly true when using chopped glass fibers in, say, the one-sixteenth ($\frac{1}{16}''$) inch to one-half ($\frac{1}{2}''$) inch size range.

While these components (additives), including catalyst up to about 4%, preferably from 0.05% to 0.5%, based upon the total weight of the glass and the polymer, may be incorporated in a number of ways into the oxymethylene polymer, excellent results are achieved by merely melting the oxymethylene polymer at, e.g. 180° C. and gradually milling in the glass strands, isocyanate and catalyst. The sequence is not critical. According to one embodiment, the oxymethylene polymer is milled on a two-roll mill while in the melt stage and ⅛-inch chopped glass strands (representing a quantity equal to 40 weight percent of the total weight of the glass and oxymethylene polymer) is milled in for 3 minutes, total loading time being about 5 minutes. Subsequently, a small amount of hexamethylene diisocyanate and catalyst are milled in for 3 minutes, total loading time being about 1.5 minutes.

Obviously, this sequence may be reversed and the desirable properties achieved as described hereinabove. If desired, the isocyanate and catalyst may be incorporated into a prefilled (glass strands) oxymethylene resinous polymer which is subjected to elevated temperatures to convert it to plastic form, and while in said plastic form is shaped in an operation which includes passage through a constricted orifice. The isocyanate readily blends with the prefilled resinuos polymer during the shaping step, while at the same time providing the enhanced characteristics discussed hereinabove. In other words, the glass fibers and isocyanate combine to provide properties which cannot be achieved by use of glass fibers alone or isocyanate alone, these properties representing a combined total effect greater than the sum of the two effects achieved when using glass fibers and isocyanate independently.

When isocyanate compounds containing two or more isocyanate groups are used they may be either aromatic or aliphatic in nature.

Among the suitable isocyanates are toluene-2,4-diisocyanate, p-phenylene diisocyanate, 4,4'-diphenyl methanediisocyanate. Aliphatic diisocyanates, such as hexamethylene diisocyanate, may also be used. Triisocyanates, such as 4,4',4''-triphenyl methane triisocyanate and the reaction product of trimethylolpropane and 2,4-toluene diisocyanate in a 1:3 mol ratio, are also suitable. Blocked isocyanates, such as the reaction product of the last-named compound with 3 mols of phenol may also be used.

The novel oxypolymers of the present invention have many uses since they possess rheological properties which are suitable for commercial molding or forming operations, e.g., injection molding, compression molding, blow molding, rotational casting, etc., including maintenance of structural integrity over wide molding temperature ranges (e.g., absence of voids, thermal stability, etc.).

As indicated hereinabove, the oxycopolymer of the present invention contain oxymethylene ($-CH_2O-$) units (usually at least 85 mol percent) interspersed with up to about 15 mol percent of ($-OR-$) units, wherein R is a divalent radical containing at least two carbon atoms directly linked to each other and positioned in the chain between the two valences, with any substituent in the R radical being inert. Suitable such copolymers may have a number average molecular weight of from about 1000 up to about 80,000 or higher, with inherent viscosities ranging from about 0.2 to about 1.5 or higher. Dependent upon the type and extent of property modification sought, the low molecular weight, e.g. 1000 to 10,000, the high molecular weight 30,000 to 80,000 species, or any mixture thereof may be preferred. The preferred copolymers are disclosed in U.S. Patent No. 3,27,352 of Walling, Brown and Bartz, incorporated herein by reference.

Moldable oxymethylene polymers having branched chains (said chains comprising a plurality of branches of successively recurring oxymethylene units) may also be employed to advantage in the practice of this invention, and may be preferred for certain applications. Such polymers may be prepared by copolymerizing trioxane with a small amount of a chain branching agent, the small amount being sufficient to link some primary oxymethylene chains to provide a branched structure but insufficient to make the polymer intractable. Primary chains are linear chains comprising successively recurring oxymethylene units and are the chains which would be produced if the chain branching agent were omitted from the system. The amount of chain branching agent used is generally not more than that required to provide one link to another chain for each primary chain in the system.

Suitable chain branching agents, depending on the particular circumstances involved, include those having at least two functional oxygen groups including (1) cyclic ethers having at least two cyclic ether rings, such as 2,2-(trimethylene)bis - 1,3-dioxolane, and particularly those compounds having (a) at least two epoxy rings, such as polyepoxides, including diepoxides, triepoxides, etc., (b) at least two formal rings, such as pentaerythritol diformal, and (c) at least one epoxy ring and at least one formal ring, such as monocrotylidene trimethylolethane monoepoxide; and (2) compounds having at least two oxo groups, such as dialdehydes and diketones, such as glutaraldehyde, terephthaldehyde and acrolein dimer.

Suitable polyepoxides include those which may be prepared by the epoxidation of compounds having two or more olefinic linkages. Diepoxides of diolefins are usually used and the epoxidized olefinic bonds may be of aliphatic or cycloaliphatic structures. Particular diepoxides which may be used include butadiene dioxide, vinyl cyclohexene dioxide (1-epoxyethyl-3, 4-epoxycyclohexane), limonene dioxide, resorcinol diglycidyl ether, butane diol digylcidyl ether, bis-epoxydicyclopentyl ether of ethylene glycol, dicyclopentadiene dioxide and dicrotilidene pentaerythritol diepoxide. Suitable triepoxides include triglycidyl trimethylol propane prepared by reacting the triallyl ether of trimethylolpropane in a solvent with peracetic acid at a temperature of 0 to 75° C. (as disclosed in application Ser. No. 152,672, filed on Nov. 15, 1961 by Sammy Carpenter). Suitable polyepoxides include a polyepoxy glyceryl ester containing an average of 5.5 epoxy groups per molecule, known as Epoxol 9–5 (sold by Swift & Co.).

The chain branching agents are usually copolymerized with the trioxane in proportions from about 0.01 to about 7 weight percent, preferably less than about 1%, and most preferably from about 0.05 to about 0.80 weight percent of the chain branching agent based on the weight of trioxane.

The most preferred such polymers are terpolymers of trioxane, a chain branching agent as described above, and a bifunctional compound. Preferred bifunctional compounds include (1) those having at least two functional groups, (2) those having at least one unsaturated bond, (3) at least one openable ring structure and (4) combinations of two or more of (1), (2) and (3). Specific bifunctional materials include those disclosed in this application, U.S. Patent No. 3,027,352 and the Kern et al. article referred to previously. In accordance with a preferred embodiment, the bifunctional compounds provide —O—R— units interspersed among the oxymethylene groups wherein R is a divalent radical containing at least two carbon atoms directly linked to each other and positioned in the chain between the two valences, with any substituents, e.g., hydrocarbons, halohydrocarbons, being inert, e.g., with respect to formaldehyde under the conditions of polymerization.

Preferred terpolymers have chains containing (1) oxymethylene groups interspersed with (2) oxyalkylene groups with adjacent carbon atoms derived from the bifunctional compounds (preferably cyclic ethers having adjacent carbon atoms) and (3) oxyalkylene groups having carbon atoms linked to other chains, the last named groups being derived from the chain branching agents.

Particularly preferred terpolymers are those wherein the (2) oxyalkylene groups with adjacent carbon atoms are oxyethylene groups derived by opening the ring structure of cyclic ethers containing oxyethylene groups, such as ethylene oxide and 1,3 dioxolane.

Other specific cyclic ethers having adjacent carbon atoms which may be used are 1,3,5-trioxepane, 1,3-dioxane, trimethylene oxide, pentamethylene oxide, 1,2-propylene oxide, 1,2-butylene oxide, neopentyl formal, tetrahydrofurane and butadiene monoxide. Because of the fact that the inclusion of the chain branching agent produces polymers of lower melt index, terpolymers containing relatively high proportions of such cyclic ethers with adjacent carbon atoms, e.g. about 10 wt. percent, are substantially improved over comparable copolymers containing no chain branching agent.

In the preferred terpolymers there is generally from about 75 to about 99.5 percent by weight of recurring oxymethylene units, from about 0.5 to about 25 percent by weight of recurring units derived from the bifunctional compound (such as a cyclic ether with adjacent carbon atoms) and from about 0.01 to about 7 weight percent of units derived from the chain branching agent. The most preferred terpolymers have from about 96.1 to 97.9 percent by weight of oxymethylene units and less than about 1%, preferably between about 0.05 and 0.08 percent by weight, of units from the chain branching agent.

Such polymers are most fully disclosed in application Ser. No. 229,715 of Heinz and McAndrew, filed Oct. 10, 1962 and incorporated herein by reference.

Other suitable isocyanate chemicals (additives) of the type described hereinabove are:

2,4 toluene diisocyanate;
2,6 toluene diisocyanate;
1,6 toluene diisocyanate;
diphenyl methane 4,4′ diisocyanate;
3,3′ dimethyl diphenyl methane 4,4′-diisocyanate;
3,3′ dimethyl 4,4′ diphenylene diisocyanate;
3,3 bitoluene 4,4′ diisocyanate;
o,m,p-phenylene diisocyanate;
methane diisocyanate;
chlorophenylene-2,4-diisocyanate;
chlorophenylene 2,4 toluene diisocyanate;
3,3′ dichlorodiphenyl-4,4′-diisocyanate;
4 chloro-1,3-phenylene diisocyanate;
xylene 1,4 diisocyanate;
diphenyl methane 4,4′ diisocyanate;
1,5 naphthalene diisocyanate;
1,4 naphthalene diisocyanate, and the corresponding diisothiocyanates and the isocyanate-isothiocyanates; alkylene diisocyanates, such as 1,6 hexamethylene diisocyanate; 1,2 ethylene diisocyanate; 1,3-propylene diisocyanate; 1,4 tetramethylene diisocyanate; 1,5 pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanate-isothiocyanates; cycloaliphatic diisocyanates, such as 1,3 cyclohexylene diisocyanate; 1,3 cyclopentylene diisocyanate; 1,4 cyclohexylene diisocyanate, 4,4′ methylenebis-(cyclohexyl isocyanate) and the corresponding diisothiocyanates and isocyanate-isothiocyanates; triisocyanates, such as triphenyl methane triisocyanate; 1,3,5 benzene triisocyanate, and the corresponding isothiocyanates and isocyanate-isothiocyanates. Mixtures of any of the aforementioned compounds, such as mixtures of the 2,4 and 2,6 isomers of toluene diisocyanate, may also be desirable in certain applications.

Aromatic diisocyanates, especially derivatives thereof having electronegative substituents are particularly desirable, due to their increased reactivity. The electronegative substituents, such as, for example,

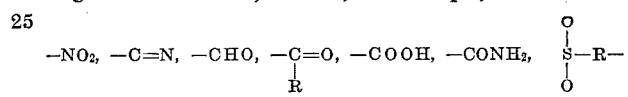

and —CF₃ groups, apparently assist the polymerization tendency of the isocyano or isothiocyano groups. The differing reactivities of the isocyano groups may be used to advantage in certain applications. Generally, the reactivity of the second isocyano group decreases upon reaction of the first (e.g. in phenylene diisocyanate, the second isocyano group reacts about half as fast as the first such group to react). Reaction of the isocyanate with the polyoxymethylene polymer may be carried out in a number of ways, as suggested hereinabove. According to a still further embodiment, the oxymethylene polymer may be charged in solid particulate state, say as flakes or pellets, with a suitable isocyanate to a reaction zone maintained at an elevated temperature in a range sufficient to maintain the polymer in melt state during the reaction. Generally, temperatures between about 100° C. and about 275° C. are employed, with the range of about 150° C. to about 250° C. being preferred for a melt state of the preferred oxymethylene copolymers. In view of the increased viscosity of the preferred oxymethylene terpolymers, slightly higher temperatures are employed. While atmospheric pressures are preferable for ease of operation, lower and higher pressures, e.g. 0 to 1000 p.s.i., are also suitable. While not essential to the reaction, a blanket of inert gas, such as nitrogen, is customarily employed.

Obviously, the glass fibers may be introduced simultaneously with the isocyanate. Generally, the isocyanate, glass fibers and catalyst are successively introduced, the sequence not being critical. This will be more apparent from the examples infra.

As suggested hereinabove, the process of the present invention may be conducted in any suitable blending apparatus. For example, incorporation of the additives into the polyoxymethylene polymer may be carried out in a roll mill apparatus having oppositely rotating hollow cylindrical rolls of, e.g., 12-inch diameter, driven at a speed in the range of 20 to 40 revolutions per minute, and steam heated to a temperature in the range of 165° C. to about 195° C. The cylindrical rolls have a variable clearance ranging down to a few thousandths of an inch, which clearance is varied during the course of the milling.

Oxymethylene copolymers of the type described hereinbefore and having interspersed carbon-to-carbon linkages may be stabilized by degrading the unstable end portions of the molecules consisting of successive terminal oxymethylene groups until a stable terminal group having a carbon-to-carbon linkage, e.g., an oxyethylene terminal group is reached. The degradation may be thermal degradation, as disclosed in U.S. Patent 3,103,499 of Dolce and Berardinelli on Apr. 2, 1959, or by hydrolysis, as disclosed in application Ser. No. 102,097 filed Apr. 11, 1961, which is a continuation-in-part of application Ser. No. 23,658 filed by Berardinelli on Apr. 21, 1960. The preferred copolymers of this invention may be stabilized by either of these methods, although stabilization by hydrolysis is preferred.

The present invention will best be understood from the examples which follow. Percents are given by weight therein, unless otherwise indicated, and melt indices are determined by heating a sample of a polymer in a standard cylinder to a standard temperature of 190° C. and forcing it under a standard load of 2.160 kilograms through a standard orifice of 0.0825-inch diameter and 0.315-inch long for a standard period and weighing the polymer passing through the orifice during this period.

All other data were determined in accordance with ASTM Standards, except as otherwise indicated.

EXAMPLES 600 grams of polyoxymethylene copolymer (except where indicated otherwise) having a melt index ($1x$) of 9.0 decigrams per minute and having a 2.0% oxyethylene units and 98% oxymethylene units, is melted at 180° C. on a two-roll mill. Two milliliters of stannous octoate catalyst is dispersed into the melt over a period of two minutes. Then 400 grams (except where indicated otherwise) of glass strands (⅛″ chopped strands Owens Corning vinyl silane finish #847—except run J, infra) is milled in for three minutes (loading time five minutes). Finally, 20 milliliters of hexamethylene diisocyanate is milled in for three minutes (loading time 1.5 minutes). The milled mix is stripped from the rolls, chip-ground, and injection-molded into test specimens. Results of physical tests of these specimens are shown in the following tables: (Also note that all percentages are based on the combined weights of polymer and glass.)

TABLE I

|  | A | B | C | D | F | G |
|---|---|---|---|---|---|---|
| Oxymethylene [1] polymer percent | 100 | 100 | 60 | 60 | 60 | 60 |
| Glass fibers ⅛″ long, percent | 0 | 0 | 40 | 40 | 40 | 40 |
| Hexamethylene diisocyanate, percent | 0 | 3.3 | 0 | 0 | 0 | 2 |
| Catalyst,[2] percent | 0 | 0.33 | 0 | 0.2 | 0 | 0.2 |
| Tensile strength (p.s.i.) | 8,800 | 9,260 | 10,960 | 10,100 | 17,000 | 18,200–20,760 |
| Elongation, percent | 40 | 22 | 1.4 | 1.4 | 2.4 | 3.5–4.2 |
| Flex strength (p.s.i.) | 13,000 | 13,030 | 17,800 | | 26,500 | 31,800–34,520 |
| Flex Modulus (×10⁶ p.s.i.) | 0.375 | 0.404 | 1.72 | | 1.68 | 1.64–1.70 |
| Izod impact (ft.-lb./in. of notch) | 1.2 | 1.69 | 0.78 | 0.72 | 0.91 | 1.89–1.98 |
| I.T.I.[3] (ft.lb./in.²) | 50 | 92.8 | 23.4 | | | 45.3 |
| Yield or Maximum (p.s.i.) | 13,300 | 12,700 | 11,700 | | | 24,000 |
| Time to yield (ms.) | 0.26 | 0.49 | | | | 0.22 |
| Time to break (ms.) | 0.55 | 0.87 | 0.15 | | | 0.28 |

[1] As described in the example, supra.
[2] Catalyst stannous octoate; percent is based on volume of catalyst to combined weight of glass and polymer.
[3] Instrumented Tensile Impact.—Ref: P. P. Kelly and T. J. Dunn, "Instrumented Tensile Impact Testing of Thermoplastics" Materials Research and Standards—July 1963 ASTM Designations D-1822, 61 T.

TABLE II

|  | H | I | J | K | L |
|---|---|---|---|---|---|
| Oxymethylene [1] polymer, percent | 75 | [2] 75 | 75 | 60 | 60 |
| Glass fibers ⅛″ long, percent | 25 | 25 | [3] 25 | 40 | 40 |
| Hexamethylene diisocyanate, percent | 2 | 2 | 2 | 1 | 2 |
| Catalyst,[4] percent | 0.2 | 0.2 | 0.2 | 0.2 | 0.2 |
| Tensile strength (p.s.i.) | 17,200 | 17,150 | 16,880 | 22,610 | 19,960 |
| Elongation, percent | 4.3 | 4.6 | 4.2 | 4.0 | 4.1 |
| Flex strength (p.s.i.) | 26,900 | 27,500 | 25,700 | 35,670 | 31,500 |
| Flex modulus (×10⁶ p.s.i.) | 1.04 | 1.07 | 1.08 | 1.70 | 1.56 |
| Izod impact (ft.-lb./in. of notch) | 1.80 | 2.17 | 1.87 | 1.94 | 2.55 |
| I.T.I.[5] (ft.-lb./in.²) | 36.1 | 43.7 | 42.2 | 42.5 | 40.8 |
| Yield or maximum (p.s.i.) | 16,100 | 21,100 | 18,300 | 19,900 | 22,000 |
| Time to yield (ms.) | | | | | |
| Time to break (ms.) | 0.26 | 0.30 | 0.34 | 0.31 | 0.32 |

[1] As described in the example, supra.
[2] Melt index 2.5.
[3] ⅛″ chopped strands Owens Corning starch oil finish #636.
[4] Catalyst stannous octoate; percent is based on volume of catalyst to combined weight of glass and polymer.
[5] Instrumented Tensile Impact.—Ref: P. P. Kelly and T. J. Dunn, "Instrumented Tensile Impact Testing of Thermoplastics" Materials Research and Standards—July 1963 ASTM Designations D-1822-61 T.

The results are reported in grams per 10 minutes. The test is described in detail in ASTM D-1238-57T.

The melt index ($10x$) is generally used when melt index values are low and is determined in an identical manner, except that the standard load is increased tenfold to 21.60 kilograms.

Thermal degradation rate constants ($K_D230$) are determined by blending a 5 gram polymer sample with a suitable chemical stabilizer system (preferably 0.5 weight percent of 2,2′ - methylene bis 4 - methyl - 6 - t - butyl - phenol, 0.02–0.04 weight percent of melamine, and 0.08–0.12 weight percent of cyanoguanidine), placing the sample in a circulating air oven maintained at 230° C. for a period of 45 minutes and reweighing the sample. The thermal degradation is expressed as the average rate of weight loss over the test period.

Still further examples of various processes and products of the present invention follow:

700 grams of polyoxymethylene copolymer having a melt index ($1x$) of 28 decigrams per minute and having 2.0% oxyethylene units and 98% oxymethylene units, is melted at 180° C. on a two-roll mill. Two milliliters of catalyst is dispersed into the melt over a period of two minutes. Then 300 grams of glass strands (⅛″ chopped strands Owens Corning vinyl silane finish #847) is milled in for three minutes (loading time five minutes). Finally, the amount of diisocyanate indicated in Table III is milled in for three minutes (loading time 1.5 minutes).

The milled mix is stripped from the rolls, chipground, and injection-molded into test specimens. Results of physical tests of these specimens are shown in the following table: (Also note that all percentages are based on the combined weights of polymer and glass.)

pp. 261–264) have varying degrees of catalytic activity and enhancement and synergism discussed hereinbefore are likewise varyingly affected.

TABLE III

|  | M | N | O [1] | P |
|---|---|---|---|---|
| Oxymethylene polymer, percent | [2] 70 | [2] 70 | [3] 70 | [2] 70 |
| Glass fibers ⅛" long, percent | 30 | 30 | 30 | 30 |
| Diisocyanate, percent | [4] 1 | [4] 2 | [5] 3 | [5] 1 |
| Catalyst, percent | [6] 0.2 | [6] 0.2 | [7] 0.2 | [7] 0.2 |
| Tensile Strength (p.s.i.) | 19,000 | 19,580 | 17,120 | 15,900 |
| Elongation, percent | 4.6 | 4.4 | 3.5 | 3.0 |
| Flex strength (p.s.i.) | 29,260 | 30,120 | 25,300 | 23,180 |
| Flex modulus (×10⁵ p.s.i.) | 1.28 | 1.30 | 1.25 | 1.29 |
| Izod impact (ft.-lb./in. of notch) | 1.6 | 1.7 | 1.3 | 1.2 |
| I.T.I. [8] (ft.-lb./in.²) |  |  |  |  |
| Yield or maximum (p.s.i.) | 23,100 | 20,380 | 16,200 | 16,400 |
| Time to yield (ms.) [9] |  |  |  |  |
| Time to break (ms.) [9] | 0.27 | 0.23 | 0.18 | 0.16 |

[1] All ingredients are dry-blended and compounded by melt extrusion.
[2] Same oxymethylene polymer as described in the example immediately preceding this table.
[3] Same oxymethylene polymer as described in the example immediately preceding Table I, supra.
[4] Hexamethylene diisocyanate.
[5] Diphenylmethane diisocyanate (Nacconate 300—Allied Chemical).
[6] Catalyst stannous octoate; percent is based on volume of catalyst to combined weight of glass and polymer.
[7] Sodium phenolate.
[8] Instrumented Tensile Impact (as in Table I and II, supra).
[9] (ms.) = milliseconds.

Obviously, the above examples are merely illustrative. Substitution of the specific isocyanates mentioned hereinbefore for the isocyanates in the above examples yields very desirable results of the type contemplated herein. Likewise, various homopolymers, copolymers and terpolymers within the purview of the instant discovery may be used interchangeably to achieve the desired results. While glass strands ⅛"-long are used in the above examples, it must again be noted that substantially shorter strands, say ¹⁄₁₆", and substantially longer strands, say ½", are suitable for the present invention. Furthermore, other catalysts of the type discussed hereinabove are the organic salts of alkali metals, lead, iron, tin, cobalt, vanadium, titanium; trialkylenediamines; N-alkylethyleneimines; and the like, the following being typical: sodium o-phenylphenate; sodium trichlorophenate; sodium tetramethoxyborate; sodium tetrachlorophenate; sodium methylcarbonate; sodium pentachlorophenate; lead linoresinate; lead naphthenate; lead oleate; lead 2-ethylhexonate; lead resinate; ferric 2-ethylhexoate; ferric chloride; ferric acetylacetonate; dibutyltin sulfide; dibutyltin acetylacetonate; dibutyltin dibutoxide; dibutyltin maleate; dibutyltin di-o-phenylphenate; dibutyltin dilaurate; dibutyltin diacetate; dibutyltin di-2-ethylhexoate; stannous oleate; stannous 2-ethylhexoate; stannous chloride; butyltin trichloride; tributyltin oxide; tributyltin o-phenylphenate; tributyltin cyanate; cobalt 2-ethylhexoate; cobalt naphthenate; cobalt linoresinate; cobalt benzoate; cobalt acetylacetonate; vanadium acetylacetonate; vanadyl acetylacetonate; tetraisopropyl titanate; dibutyltitanium dichloride; methoxytitanium trichloride; butoxytitanium trichloride; tetrabutyl titanate; tetra-2-ethylhexyl titanate; titanium acetylacetonate; triethylenediamine; n-ethylenimine; tetramethylguanidine; 1-methyl-4-(dimethylaminoethyl)piperazine; N,N,N',N' - tetramethyl-1,3-butylenediamine; N-ethylmorpholine; triethylamine; copper acetylacetonate; copper naphthenate; manganous acetylacetonate; manganous linoresinate; manganous 2-ethylhexoate; cadmium nitrate; cadmium laurate; cadmium alkyl aryl phosphite complex; zinc acetylacetonate; zinc naphthenate; thorium acetylacetonate; thorium nitrate; nickel acetylacetonate; nickelocene; chromium acetylacetonate; uranyl nitrate; dimethylsilicon - di-2-ethylhexoate; magnesium acetylacetonate; aluminum acetylacetonate; zirconium acetylacetonate; beryllium acetylacetonate; tributylphosphine; diphenylmercury; and the like.

Obviously, these catalysts, and like isocyanate-active catalysts (Industrial and Engineering Chemistry, Product Research and Development, vol. 1, No. 4, December 1962, Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A normally-solid, synthetic oxymethylene polymer having at least 60% recurring oxymethylene units and having incorporated therewith from about 0.1% to about 5% by weight isocyanate compound wherein said isocyanate compound contains from two to three isocyanate groups and up to about equal parts by weight of glass strands, the amount of said isocyanate being based upon the combined weights of said polymer and glass, and the amount of the glass strands being based upon the weight of said polymer.

2. The polymer of claim 1 wherein the isocyanate is a diisocyanate.

3. The polymer of claim 1 wherein the isocyanate is hexamethylene diisocyanate.

4. A normally solid, synthetic oxymethylene polymer having at least one chain containing at least 85 mol percent of oxymethylene (—OCH₂) units interspersed with —OR— units, wherein R is a divalent radical containing at least two carbon atoms directly linked to each other and positioned in said chain between the two valences, any substituents in said R radical being inert, said polymer having incorporated therewith from about 0.1% to about 5% by weight isocyanate compound wherein said isocyanate compound contains from two to three isocyanate groups and up to about equal parts by weight of glass strands, the amount of said isocyanate being based upon the combined weights of the polymer and glass, and the amount of the glass strands being based upon the weight of said polymer.

5. The polymer of claim 4 wherein the isocyanate is a diisocyanate.

6. The polymer of claim 4 wherein the isocyanate is hexamethylene diisocyanate.

7. A process for preparing a normally solid, synthetic oxymethylene polymer having at least one chain containing at least 85 mol percent of oxymethylene (—OCH₂)

units interspersed with —OR— units, wherein R is a divalent radical containing at least two carbon atoms directly linked to each other and positioned in said chain between the two valences, any substitutent in said R radical being inert, which comprises intimately admixing with said polymer from about 0.1% to about 5% by weight isocyanate compound wherein said isocyanate compound contains from two to three isocyanate groups and up to about equal parts by weight glass strands, the amount of said isocyanate being based upon the combined weights of the polymer and glass, and the amount of said glass strands being fibers based upon the weight of the polymer.

8. The process of claim 7 wherein the isocyanate is a diisocyanate.

9. The process of claim 7 wherein the isocyanate is hexamethylene diisocyanate.

10. The process of claim 7 wherein the isocyanate and glass fibers are incorporated into the polymer by heating the polymer to a temperature in the range of 100° C. to 275° C. in intimate admixture with the isocyanate and glass fibers.

11. The product of claim 1 wherein the polymer has incorporated therewith, in addition, up to about 4% by weight catalyst, based upon the combined weights of said polymer and glass.

12. The product of claim 1 wherein the polymer has incorporated therewith, in addition, from 0.05% to 0.5% by weight catalyst, based upon the combined weights of the polymer and glass.

13. The product of claim 4 wherein the polymer has incorporated therewith, in addition, up to about 4% by weight catalyst, based upon the combined weights of said polymer and glass.

14. The product of claim 4 wherein the polymer has incorporated therewith, in addition, from 0.05% to 0.5% by weight catalyst, based upon the combined weights of the polymer and glass.

15. The process of claim 7 wherein up to about 4% of a catalyst, based upon the combined weights of the polymer and glass, is also admixed with said polymer.

16. The process of claim 7 wherein from 0.05% to 0.5% catalyst, based upon the combined weights of the polymer and glass is also admixed with said polymer.

References Cited
UNITED STATES PATENTS

| | | |
|---|---|---|
| 2,296,249 | 9/1942 | Austin et al. |
| 3,164,563 | 1/1965 | Maxwell et al. |
| 3,183,212 | 5/1965 | Hopff et al. |

ALLAN LIEBERMAN, Primary Examiner

R. BARON, Assistant Examiner

U.S. Cl. X.R.

260—67

UNITED STATES PATENT OFFICE
CERTIFICATE OF CORRECTION

Patent No. 3,455,867            July 15, 1969

Frank M. Berardinelli et al.

It is certified that error appears in the above identified patent and that said Letters Patent are hereby corrected as shown below:

In the specification, Column 4, line 21, the number "3,27,352" should read -- 3,027,352 --.
In Column 5, line 51, the number "0.08" should read -- 0.80 --.
In Column 5, line 73, the word "diphenyl" should read -- dixylylene --.

Signed and sealed this 4th day of November 1969.

(SEAL)
Attest:

Edward M. Fletcher, Jr.
Attesting Officer

WILLIAM E. SCHUYLER, JR.
Commissioner of Patents